United States Patent [19]

Nimpoeno

[11] Patent Number: 5,068,765
[45] Date of Patent: Nov. 26, 1991

[54] MARINE STEREO COVER WITH DETENTING HINGE

[75] Inventor: Roy Nimpoeno, Northridge, Calif.

[73] Assignee: Scosche Industries, Inc., Moorpark, Calif.

[21] Appl. No.: 476,338

[22] Filed: Feb. 6, 1990

[51] Int. Cl.⁵ .............................................. H05K 7/00
[52] U.S. Cl. ..................................... 361/422; 16/334; 361/340; 455/345
[58] Field of Search ........................ 220/242, 335, 377; 16/250, 334; 245/27.1; 455/345, 346, 347, 348, 349, 351; 361/394, 422

[56] References Cited

U.S. PATENT DOCUMENTS

| | | |
|---|---|---|
| 2,388,021 | 10/1945 | Thomas . |
| 2,707,064 | 4/1955 | Castello . |
| 3,000,049 | 1/1961 | Terry, Jr. ............... 16/334 |
| 3,911,529 | 10/1975 | Pringle . |
| 3,930,594 | 1/1976 | Jungmann . |
| 3,972,090 | 8/1976 | Holmes . |
| 4,248,069 | 2/1981 | Burbank .......................... 70/160 |
| 4,424,606 | 1/1984 | Sorimachi . |
| 4,445,228 | 4/1984 | Bruni . |
| 4,477,199 | 10/1984 | Manzoni . |
| 4,868,715 | 9/1989 | Putman et al. . |
| 4,914,781 | 4/1990 | Sokn et al. ........................ 220/335 |

Primary Examiner—Leo P. Picard
Assistant Examiner—Donald A. Sparks
Attorney, Agent, or Firm—William W. Haefliger

[57] ABSTRACT

A radio installation kit, for installing a radio to a marine vessel dash, the improvement comprising: a first plastic frame having wall structure comprising first end and side walls and a main front panel interconnecting the end and side walls; structure associated with the frame for attaching the frame to the vessel dash; a second plastic frame having second wall structure comprising second end and side walls, and a transparent window carried by the second frame, the second frame sized to be registrable with the first frame; a hinge connection between the first and second frames; and detent structure integral with the frames for retaining the second frame and window in a position opened away from the first frame to allow access to tuning structure.

9 Claims, 8 Drawing Sheets

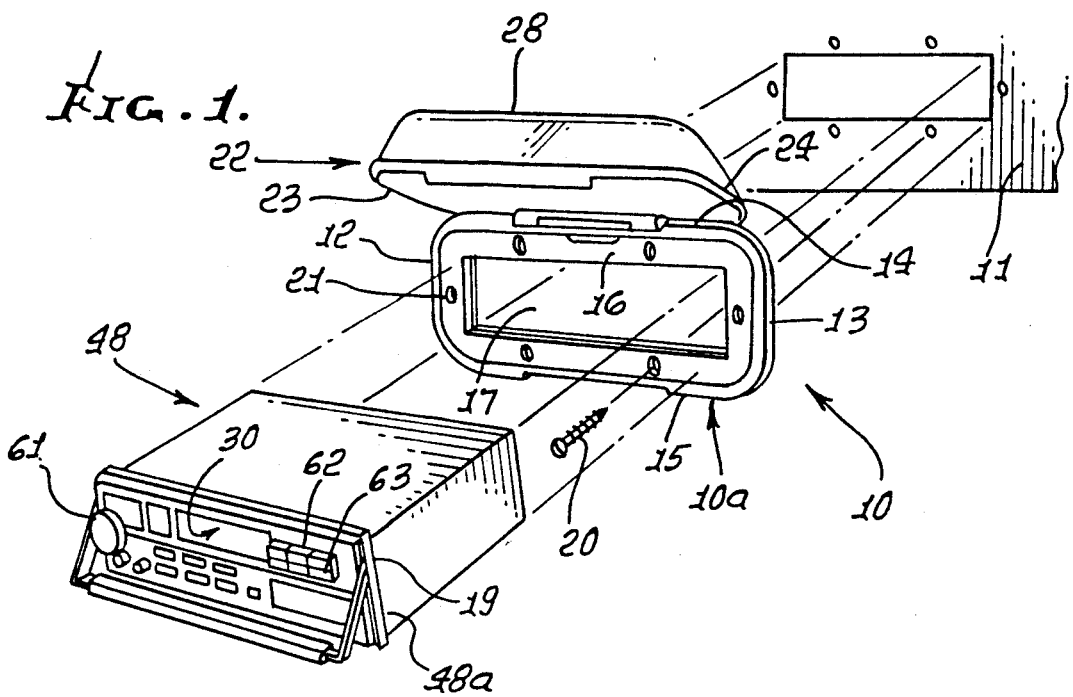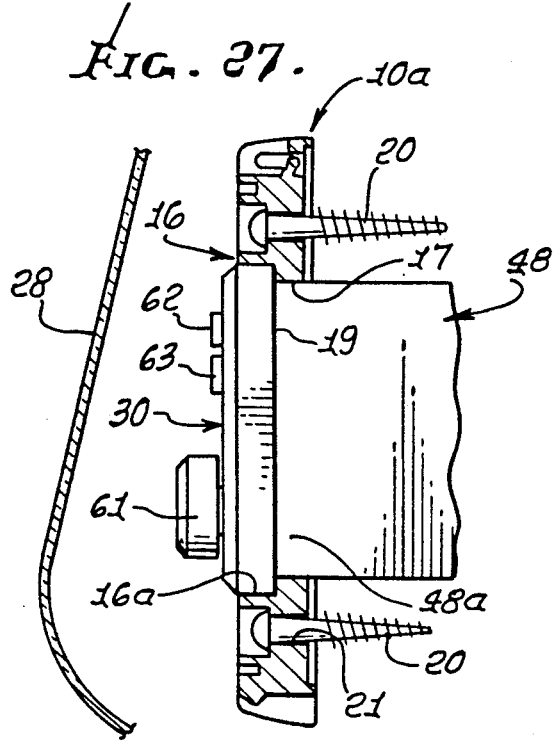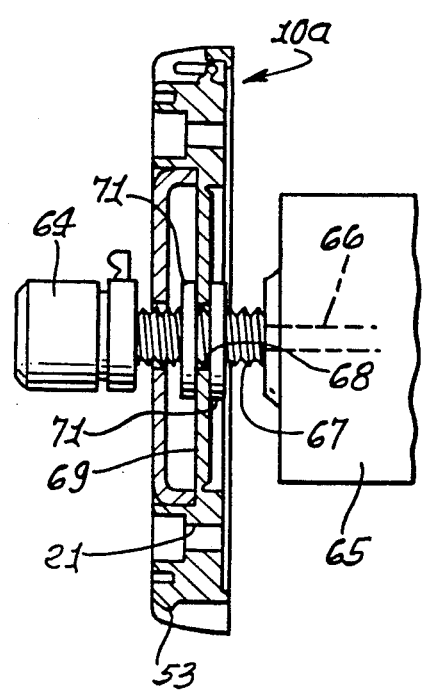

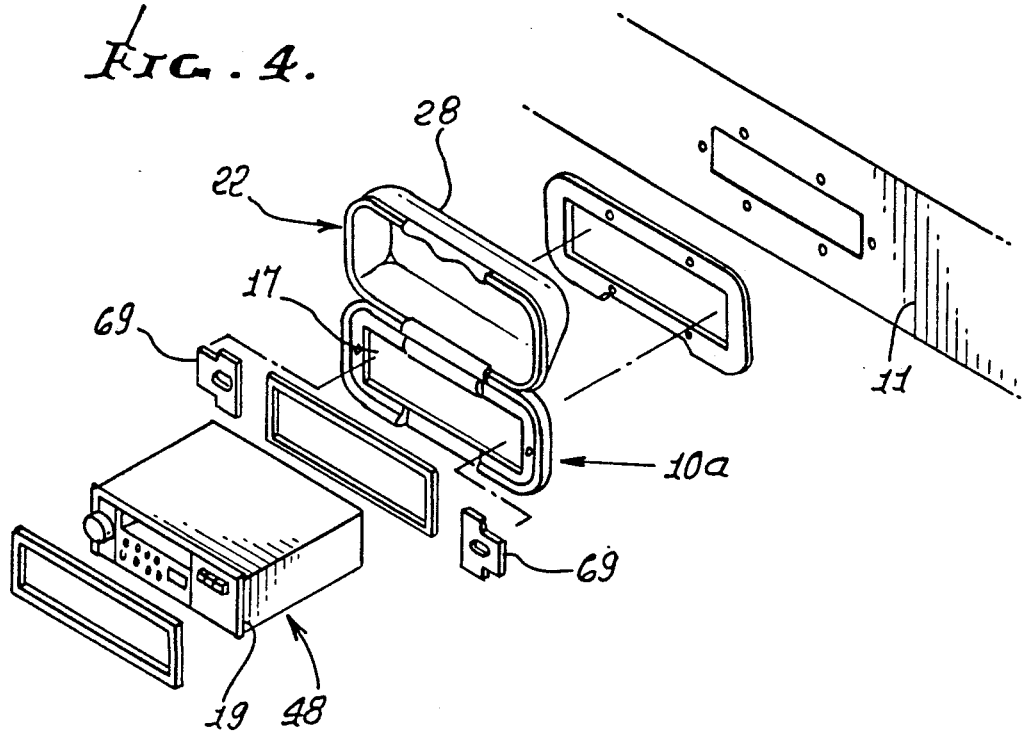
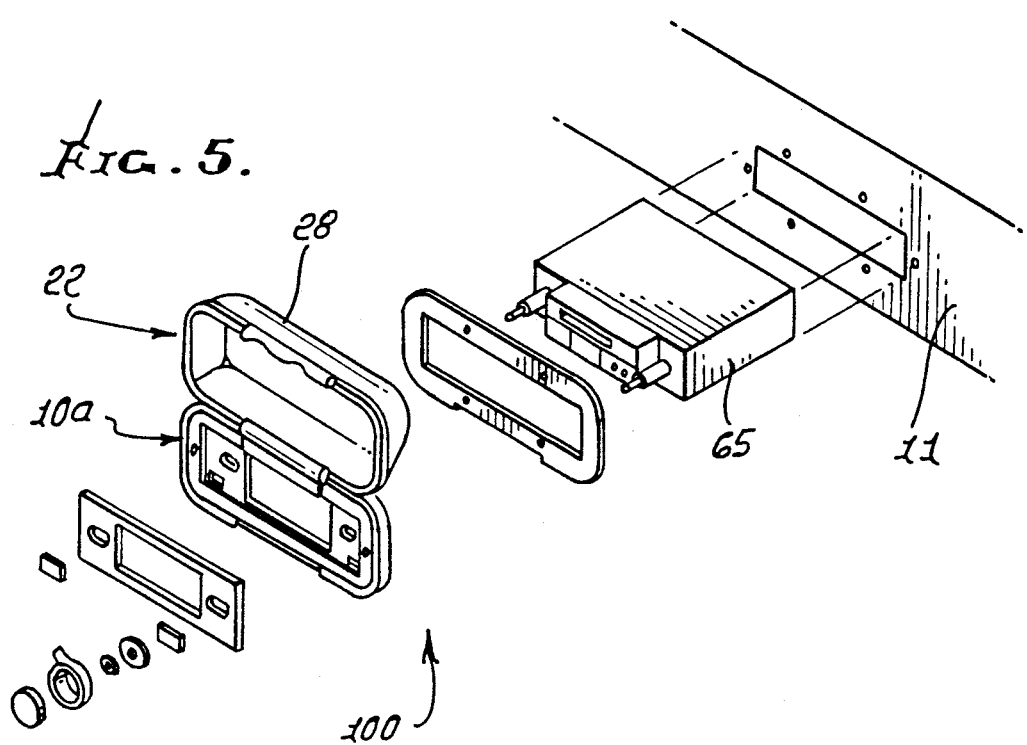

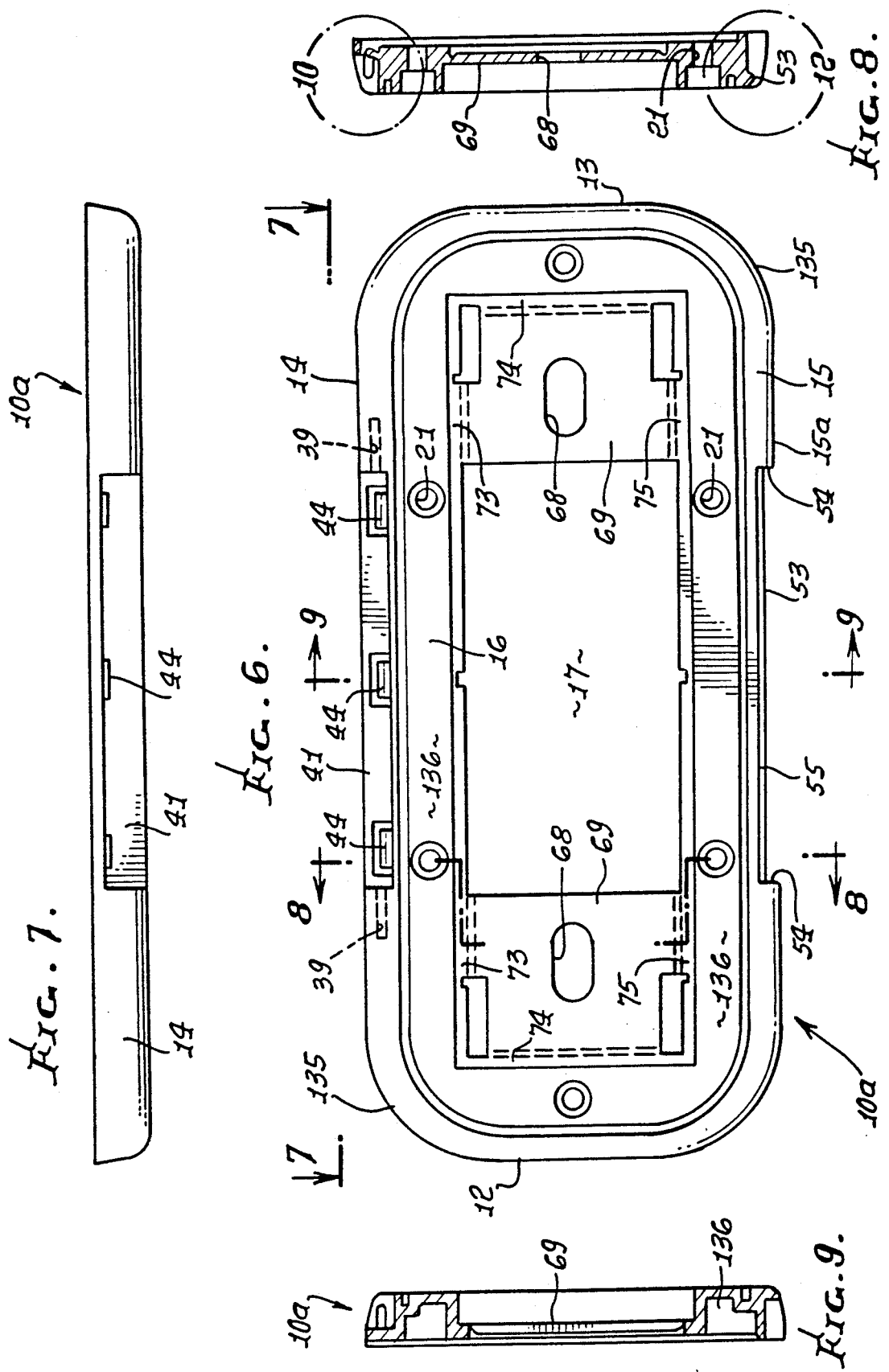

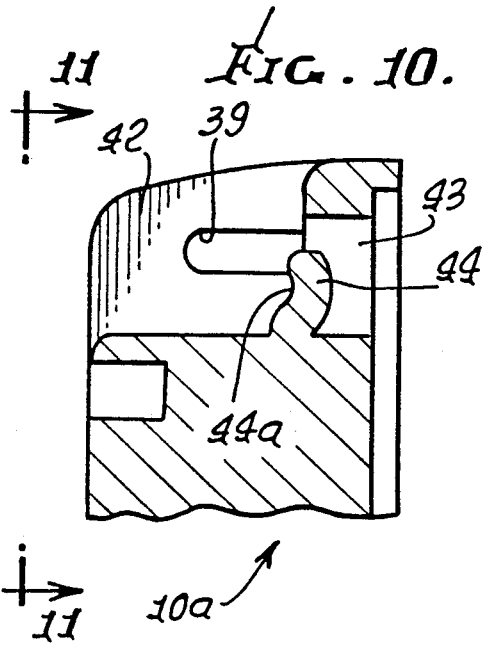
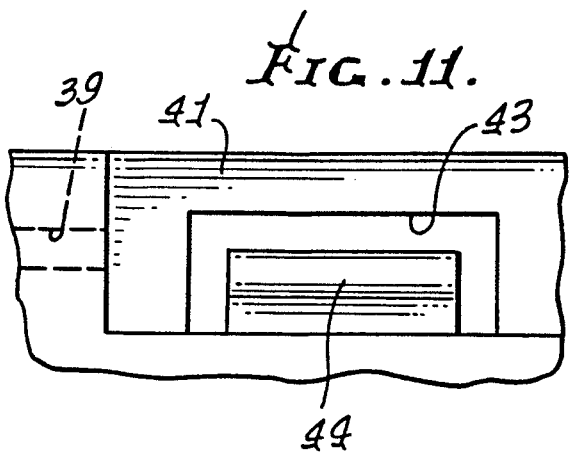
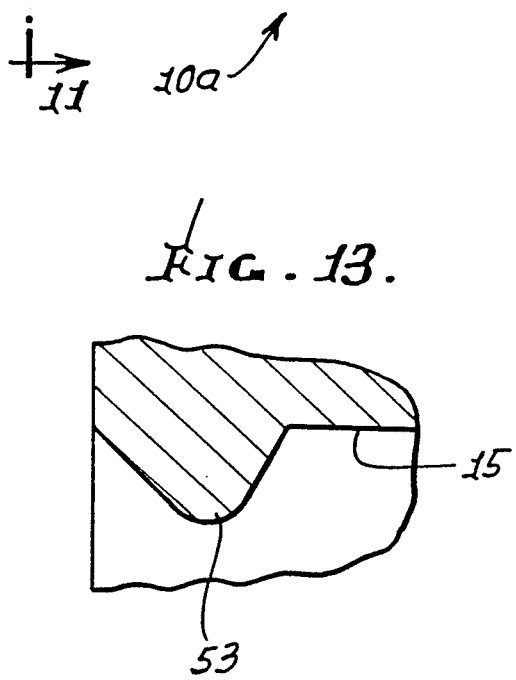
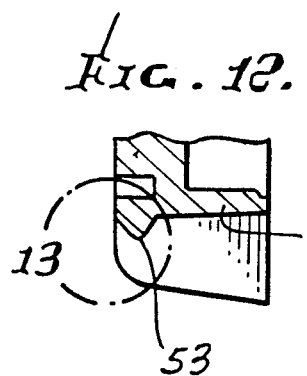
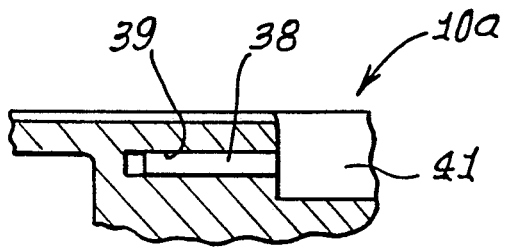

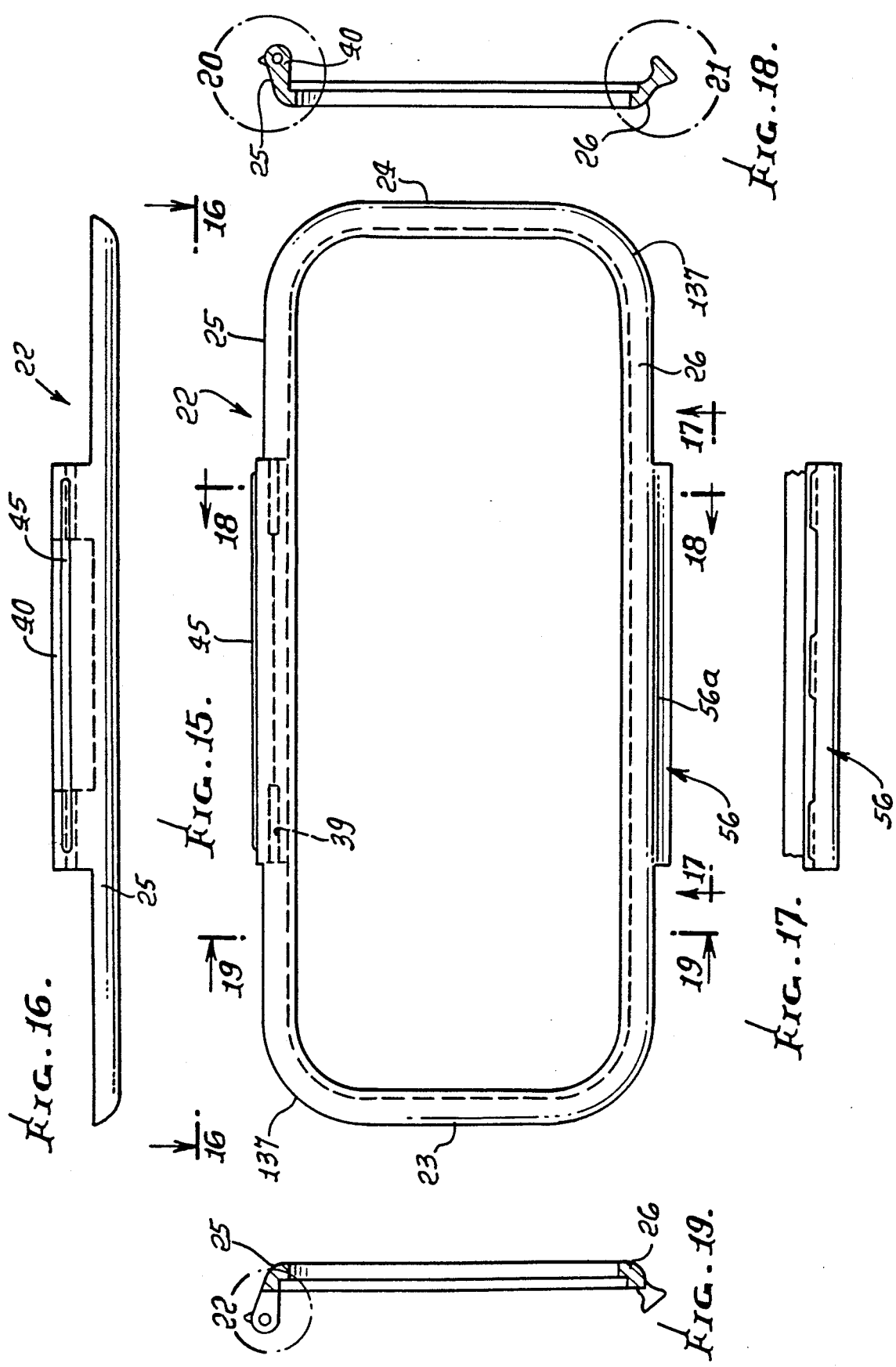

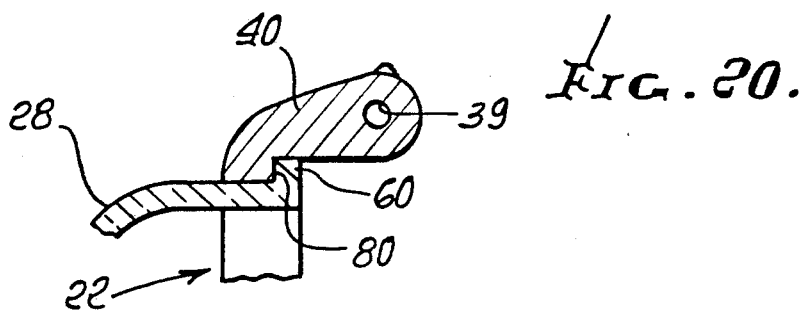
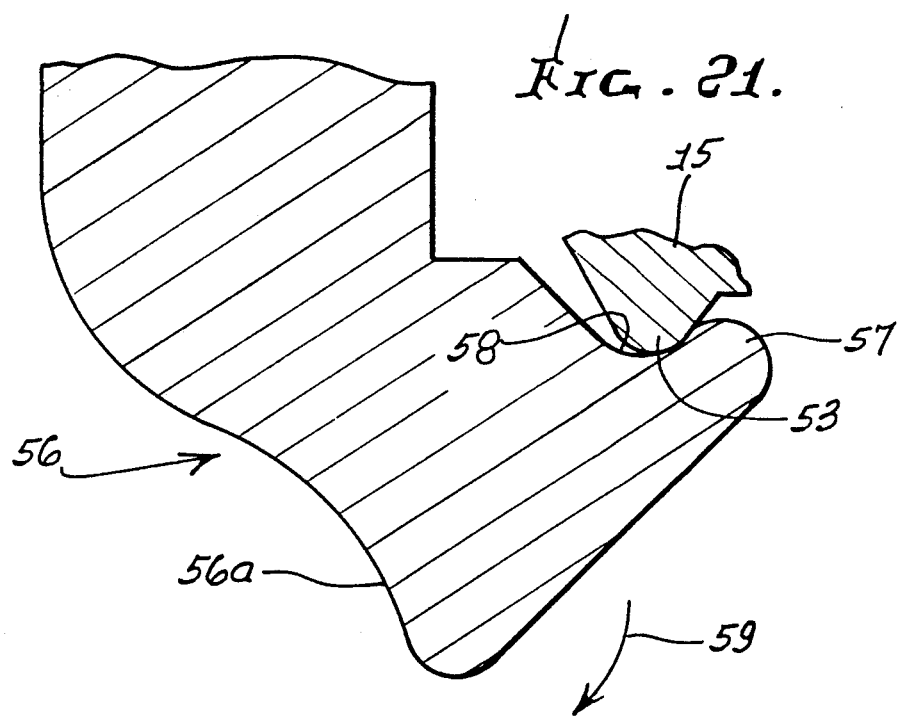
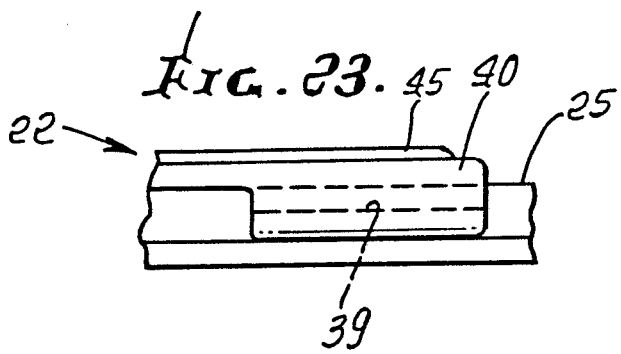
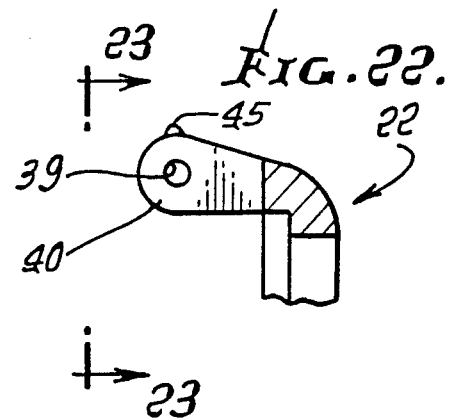

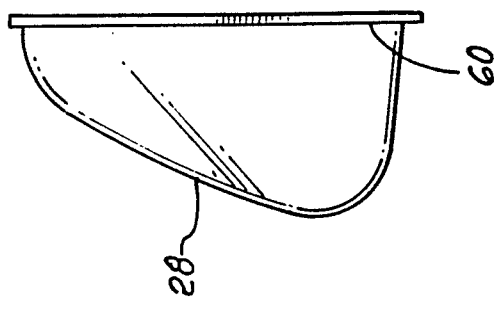
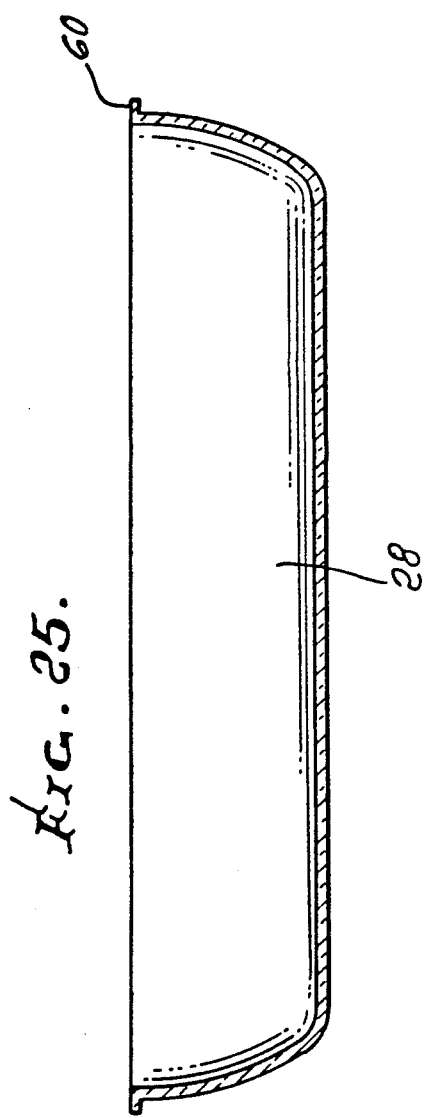
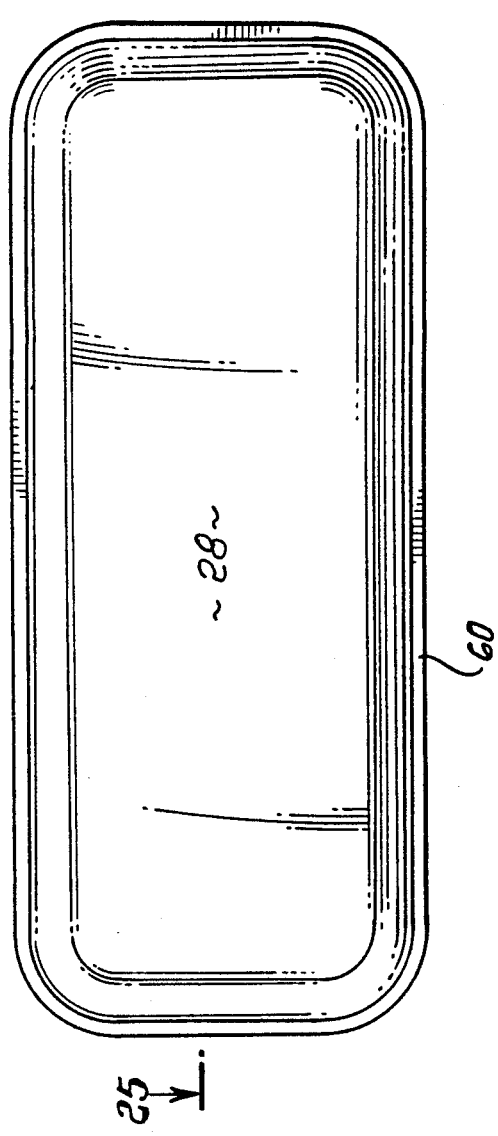

MARINE STEREO COVER WITH DETENTING HINGE

BACKGROUND OF THE INVENTION

This invention relates generally to an installation kit to facilitate the protective mounting of equipment, such as a radio or equalizer, to a marine panel, as in a boat or vessel.

In the contemporary marine vehicle (boat) market, owners frequently want to substitute for an original equipment radio that is in the boat when new, a radio of a different type. Typically, the original equipment radio is mounted to install in a cavity in the instrument panel of the boat.

Present day boats differ in style and appearance, including the size and location of the cavity in which the ra io is installed. Different conversion kits are necessary in order to fill the requirements of different boats having different instrument panel designs.

Thus, there is a strong need for a conversion kit having the capability of serving its purpose in different marine vessel environments, especially to convert to use of a DIN radio and/or equalizer (tone control) chassis, and to protect the radio (or other chassis) face as against salt water contact.

SUMMARY OF THE INVENTION

It is a major object of the invention to provide a simple, yet protective marine conversion kit which will meet the above need. Basically, the invention is embodied in a device which comprises:

(a) a first plastic frame having wall means comprising first end and side walls and a main front panel interconnecting the end and side walls, (b) means associated with the frame for attaching the frame to the vessel dash, (c) a second frame having second wall means comprising second end and side walls, and a transparent window carried by the second frame, the second frame sized to be registrable with the first frame, (d) a hinge connection between the first and second frames, and (e) detent means integral with the frames for retaining the second frame and window in a position opened away from the first frame to allow access to the tuning means.

As will be seen, the main front panel typically may have break-away wall means to comprise a thin wall or walls generally parallel to the panel but offset relative to the front of the panel. The breakaway wall means typically forms through openings to pass shaft means of a first radio having a chassis, the break-away means adapted to be broken away from the frame to provide a relatively large opening for alternate reception of a second chassis.

It is another object of the invention to provide the hinge connection and the detent means to be located at on of the first frame side walls and at one of the second frame side walls, which are mutually registrable when the second frame is brought into registration with the first frame. The first detent means may comprise mutually interengageable, mutually interfering tongues on the first and second frames, one of the tongues being resiliently deflectable.

Another object is to provide a second detent connection between the frames for holding the frames in relatively closed together condition, and wherein the second detent means are located at another of the first frame side walls and at another of the second frame side walls. Thus, the first detent means operates to releasably hold the second frame (cover) in opened condition, as during radio tuning; and the second detent means holds the cover normally closed to protect the radio controls from salt water contact.

Further objects include the provision of a radio, or other, chassis assembled to the first plastic frame via the break-away wall means, or other radio chassis connection to the first frame after break-away of such wall means, as will appears.

These and other objects and advantages of the invention, as well as the details of an illustrative embodiment, will be more fully understood from the following specification and drawings, in which:

DRAWING DESCRIPTION

FIG. 1 is an exploded perspective view of a marine cover unit and radio to be assembled to same;

FIG. 4 is an exploded perspective view a similar cover unit, together with auxiliary element associated with a chassis to be received rearwardly by the unit;

FIG. 5 is an exploded perspective view showing the FIG. 4 cover unit, together with auxiliary elements associated with a chassis and to be received forwardly by the unit;

FIG. 6 is a front view of base plate incorporated in the cover unit;

FIG. 7 is a top plan view taken on lines 7—7 of FIG. 6;

FIG. 8 is a vertical section taken on lines 8—8 of FIG. 6;

FIG. 9 is a vertical section taken on lines 9—9 of FIG. 6;

FIG. 10 is an enlarged section taken on lines 10—10 of FIG. 8;

FIG. 11 is an end view taken on lines 11—11 of FIG. 10;

FIG. 12 is an enlarged section taken on lines 12—12 of FIG. 8,

FIG. 13 is an enlarges section taken on lines 13—13 of FIG. 12;

FIG. 14 is a section showing the location of a hinge pin opening in the base plate;

FIG. 15 is a frontal view of a cover frame that is to support a transparent cover;

FIG. 16 is a top plan view taken on lines 16—16 of FIG. 15;

FIG. 17 is a bottom plan view taken on lines 17—17 of FIG. 15;

FIG. 18 is a section taken on lines 18—18 of FIG. 15;

FIG. 19 is a section taken on lines 19—19 of FIG. 15;

FIG. 20 is an enlarged section taken on lines 20—20 of FIG. 18;

FIG. 21 is a greatly enlarged section taken on lines 21—21 of FIG. 18;

FIG. 22 is an enlarged section taken on lines 22—22 of FIG. 19;

FIG. 23 is an elevation taken on lines 23—23 of FIG. 22;

FIG. 24 is an exterior frontal view of a transparent window (bubble) to be carried by the frame of FIG. 15;

FIG. 25 is a top plan view taken on lines 25—25 of FIG. 24;

FIG. 26 is an exterior end view taken on lines 26—26 of FIG. 24;

FIG. 27 is a view like FIG. 8 but showing connection of a DIN radio housing, or chassis, to the base plate; and FIG. 28 is also a view like FIG. 8 but showing connection of a shaft radio, or chassis, to the base plate.

DETAILED DESCRIPTION

Figure 3:
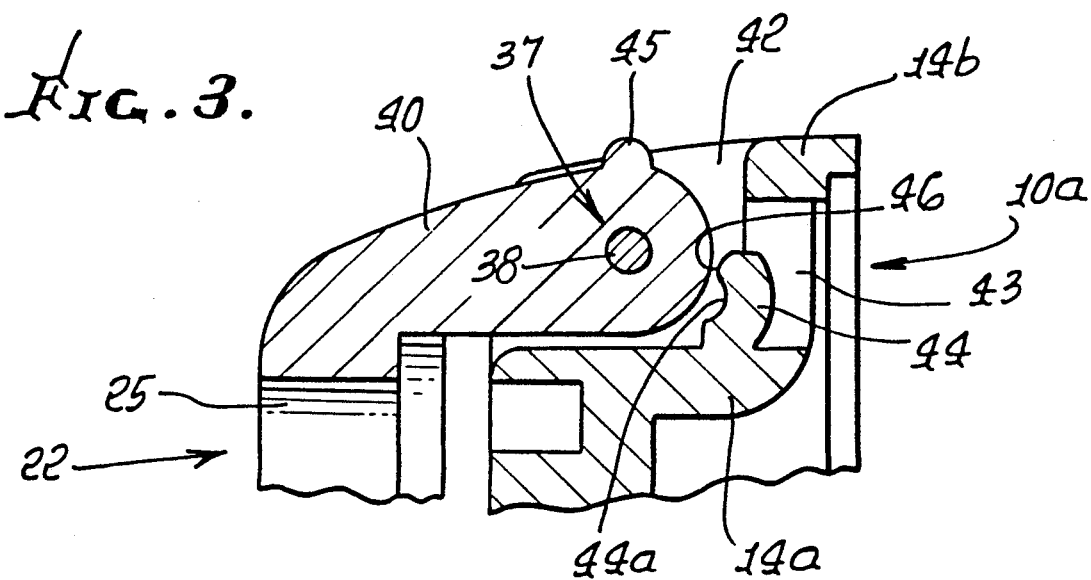
FIG. 3 is a view like FIG. 2 but showing the cover in closed position.

In FIG. 1, the marine cover unit or means 10 is adapted to be connected to a wall or instrument panel 11 in a marine vessel. The unit 10 includes a first plastic frame or base plate 10a having wall means comprising first laterally extending end walls 12 and 13, first longitudinally extending side walls 14 and 15, and a main rectangular front panel 16 interconnecting those walls, as shown. See also FIGS. 6-9. Panel 16 forms a rectangular opening 17 for reception of a radio (or other) chassis 48, so that the chassis boss 48a (see FIG. 27) extends through 17, and rectangular flange 19 of the chassis fits against or is located adjacent to the panel 16, inwardly of the walls 12 and 13, and 14 and 15. A re-entrant recess 16a in the panel 16 receives flange 19. See FIG. 27. Prior to such fitting of the chassis to the first frame unit, fasteners 20 are employed to connect the panel 16 to the wall or panel 11, as via openings 21 through 16. See also frame wall corners 135, which are curved, and frame re-entrant structure 136.

The cover unit also includes a second plastic frame, or cover plate 22, having second wall means comprising second laterally extending end walls 23 and 24, and second longitudinally extending side walls 25 and 26. See also FIGS. 15-19. The second frame is sized to be registrable with the first frame, in closed portion of the cover plate 22, whereby a transparent "bubble" window 28, carried by the plate 22, then extends protectively acros the controls face 30 of the radio chassis assembled to the unit, to block water access the face 30. In FIG. 1, the cover plate is shown in raised or opened position, and is retained in that position by detent means to be described, to allow access to the control or tuning means (see elements 61–63) associated with the face 30. See also rounded frame corners 137.

Figure 2:
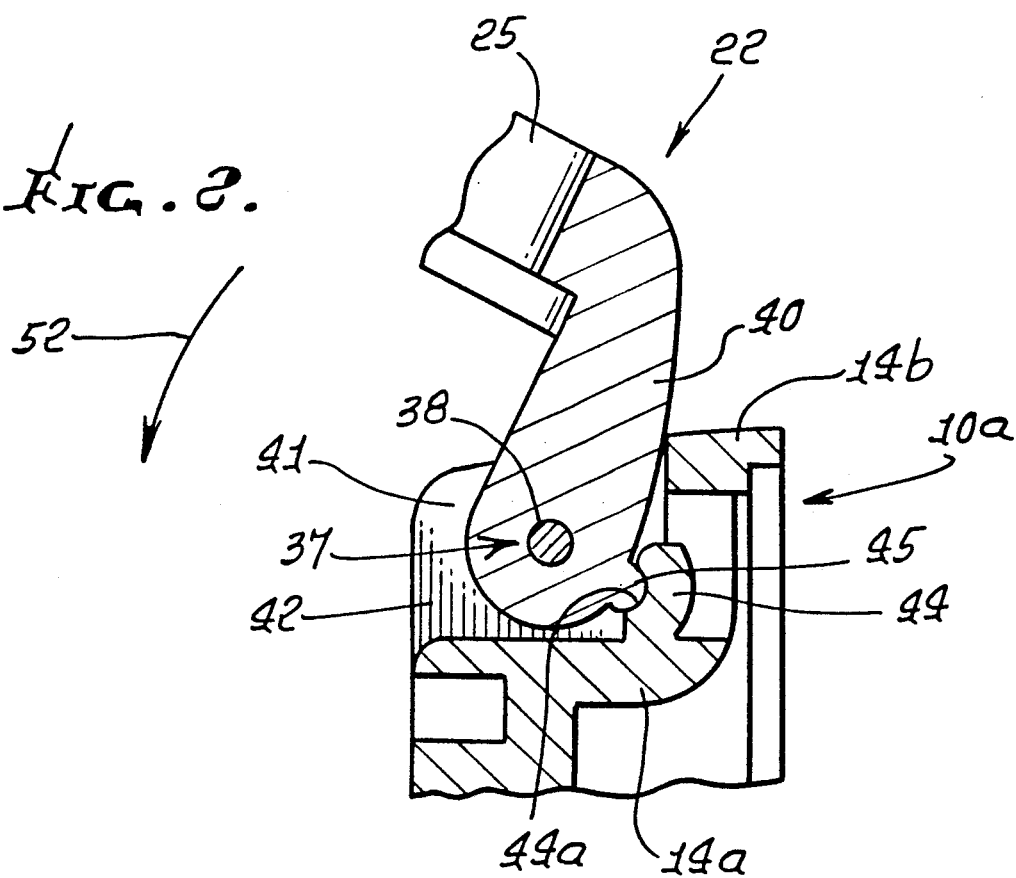
FIG. 2 is an enlarged section showing cover hinging and detenting structure incorporated in the FIG. 1 unit, the cover being open.

FIGS. 2 and 3, and 20, 22 and 23 show a hinge connection at 37 between the base plate and the cover plate 22 allowing such lifting and lowering of the cover plate. See hinge pin 38 received in aligned longitudinal openings 39 in the lug 40 on the plate 22, and in the base plate flange or lug 41. Lug 40 extends rearwardly, with L-shape, from the longitudinal side wall 25 of plate 22, and into a recess or cut-out 42 formed in the side wall structure 14a and 14b of the base plate. Note that side wall 25 registers with the side wall portions 14a and 14b. Another cut-out 43 in wall portion 14b partially receives an upstanding tongue 44 integral with wall portion 14a. Tongue 44 has a concave side 44a, facing lug 40. A tongue or protrusion 45 on the rotary lug 40 is outwardly convex, and cams over convex shoulder 46 on the outer end of tongue 44, as the cover is raised, to then be receivable in the recess formed by the concave tongue side 44a. See FIG. 2. In this process, tongue 44 is resiliently deflected toward the cut-away 43, but protrusion 45 is essentially non-deflectable. In FIG. 2, this detent connection releasably holds the cover plate in raised position, as seen in FIG. 2. Conversely, when the cover is rotated in the direction of arrow 52 in FIG. 2, the protrusion 45 rides out of the concavity in the tongue 44, and the cover then points downwardly under gravity pull toward cover closed position. Three spaced tongues 44 are provided for strength.

Accordingly, the connection provides first detent means that comprises mutually interengageable, mutually interfering tongues respectively integral with the one of the first side walls and the one of the second side walls, one of the tongues being resiliently deflectable between two stable states.

After the cover drops or is lowered to down position, a second detent connection, provided between the first and second frames, is operable to "snap connect" and hold the two frames in relatively closedtogether condition. See for example the second detent lip or protrusion 53 integral with, and projecting convexly downwardly from, the first frame lower side wall 15 in FIGS. 6, 8, 12, and 13. Elongated lip 53 is recessed inwardly from side wall 15 lowermost extents 15a, and between step shoulders 54 (see FIG. 6). That recess, at 55, between shoulders 54, receives the elongated handle 56 integral with the lower side wall 26 of the second plastic frame. Handle 56 has a second detent tongue 57 that projects convexly upwardly, as seen in FIGS. 18 and 21, to cam over the lip 53, whereby lip 53 fits in a pocket 58, as indicated in FIG. 21. Note that the tongue 57 is also elongated, and that the handle 52 defines a cantilever that is resiliently deflectable in the direction of arrow 59 in FIG. 21 to allow 57 to ride over 53 as the cover is snapped shut. This, then, holds the cover in down position, whereby the first detent is simplified in that it is not required to also hold the cover in down position. The outer, downwardly tapered surface 56a of the handle may be serrated, as shown, for firm grasping when opening the cover, or pushing when closing the cover.

FIGS. 24-26 show the provision of a transparent plastic window 28 in the form of a longitudinally elongated "bubble" to enclose and protect the radio controls when the cover is closed. See FIG. 27. Controls are indicated at 61-63. The window bubble has a peripheral flange 60 that fits in and is attached against a shoulder 80 of frame 22. See FIG. 20. Four rectangular shoulders are provided for this purpose, to peripherally seat the flange 60.

FIG. 28 shows a tuning control 64 carried by the shaft-type radio chassis 65. Control 64 may comprise a rotary knob connected to a shaft 66 passing through exteriorly threaded mounting sleeve 67. The latter passes through a slot 68 in a break-away subpanel (or wall means). Two such sub-panels are shown at 69 in FIG. 6, and they form two slots or openings 68 to pass two sleeves 67 that pass tuning shafts 66, as referred to. Washers 71 threaded onto the sleeves are tightenable against the sub-panel opposite sides to connect the radio chassis to the base plate or frame 10a to which the thin plastic sub-panels are peripherally connected as at 73-75. The break-away sub-panels may be forcibly broken away at their peripheries from the base plate to enlarge the rectangular opening 17 for alternate reception of the alternately mountable radio chassis (see FIGS. 4 and 27).

FIGS. 4 and 5 show a similar protective unit 100 as used with two different type radio chassis installations. Note that the cover 22 has a straight-up, open position, as contrasted with the angled open position of the cover in FIG. 1.

I claim:

1. In a radio installation kit, for installing a radio to a marine vessel dash, the improvement comprising:
   (a) a first plastic frame having first end and side walls and a main front panel interconnecting the end and side walls,
   (b) forwardly facing break-away wall structure integral with the frame and associated with the main front panel, said break-away wall structure forming forward through openings to pass shaft tuning means of a first radio having a chassis, the break-away wall structure adapted to be broken away from the frame to provide a relatively large opening for alternate reception of a second chassis,
   c means associated with the frame for attaching the frame to the vessel dash,
   d a second frame having second end and side walls, and a transparent window carried by the second frame, the second frame sized to be registrable with the first frame,
   e a hinge connection between said first and second frames, and
   f detent means integral with said frames for retaining the second frame and window in a positino opened away from the first frame to allow access to said tuning means,
   (g) there being a second detent connection between said frames for holding the frames in relatively closed together condition.

2. The improvement combination of claim 1 wherein the hinge connection and said detent means are located at one of said first side walls and at one of said second side walls, which are mutually registrable when said second frame is brought into registration with said first frame.

3. The improvement combination of claim 1 wherein said detent means comprises mutually interengageable, mutually interfering tongues on said first and second frames, one of the tongues being resiliently deflectable.

4. The improvement combination of claim 2 wherein said detent means comprises mutually interengagable, mutually interfering tongues respectively integral with said one of the first side walls and said one of the second side walls, one of the tongue being resiliently deflectable between two stable states.

5. The improvement combination of claim 2 including second detent connection between said frames for holding the frames in relatively closed together condition, and wherein the second detent means are located at another of said first side walls and at another of said second side walls 6. The improvement combination of claim 1 wherein said window has bubble shape to project away from the first and second frames when said frames extend in registered relation.

7. In an installation kit for installing a chassis to a marine vessel panel, the chassis having associated shaft tuning means, the improvement combination comprising:
   (a) a first frame having first end and side walls and a main front panel interconnecting the end and side walls,
   (b) forwardly facing break-away wall structure integral with the frame and associated with the main front panel, said break-away wall structure forming forward through openings to pass said shaft tuning means of a first chassis, the break-away means adapted to be broken away from the frame to provide a relatively large opening for alternate reception of a second chassis,
   (c) means associated with the frame for attaching the frame to the vessel dash,
   (d) a second frame having second end and side walls, and a transparent window carried by the second frame, the second frame sized to be registrable with the first frame,
   (e) a hinge connection between said first and second frames, and
   (f) detent means integral with said frames for retaining the second frame and window in a position opened away from the first frame to allow access to said tuning means.

8. The improvement combination of claim 7 including a shaft tuned radio chassis attached to said first frame with fastener means attaching the radio shaft to said break-away wall means.

9. The improvement combination of claim 7 wherein the first frame has a front face, a rectangular opening through said panel, and a re-entrant reess opening between said opening and said front face, and including a shaft tuned radio chassis having a boss projecting fowardly through said rectangular opening, the boss attached to said first frame.

* * * * *